United States Patent
Baldwin

(10) Patent No.: US 11,278,015 B2
(45) Date of Patent: Mar. 22, 2022

(54) FISHING REEL DRAG SYSTEM

(71) Applicant: DQC International Corp., Clearwater, FL (US)

(72) Inventor: Matt Baldwin, Palm Harbor, FL (US)

(73) Assignee: DQC International Corp., Clearwater, FL (US)

(*) Notice: Subject to any disclaimer, the term of this patent is extended or adjusted under 35 U.S.C. 154(b) by 63 days.

(21) Appl. No.: 16/749,769

(22) Filed: Jan. 22, 2020

(65) Prior Publication Data

US 2021/0219530 A1 Jul. 22, 2021

(51) Int. Cl.
*A01K 89/01* (2006.01)
*A01K 89/027* (2006.01)
*A01K 89/015* (2006.01)

(52) U.S. Cl.
CPC ........ *A01K 89/027* (2013.01); *A01K 89/0111* (2013.01); *A01K 89/01931* (2015.05)

(58) Field of Classification Search
CPC ............ A01K 89/027; A01K 89/01931; A01K 89/0111; A01K 89/011223; A01K 89/01905; A01K 89/0193; A01K 89/03; A01K 89/059
See application file for complete search history.

(56) References Cited

U.S. PATENT DOCUMENTS

| | | | |
|---|---|---|---|
| 3,948,465 A | 4/1976 | Scusa | |
| 4,154,413 A | 5/1979 | Hull | |
| 4,524,923 A | 6/1985 | Tunoda et al. | |
| 5,176,336 A | 1/1993 | Kaneko | |
| 5,393,004 A | 2/1995 | Weaver et al. | |
| 6,299,086 B1 | 10/2001 | Li et al. | |
| 6,318,655 B1 | 11/2001 | Henze | |
| 6,561,448 B2 | 5/2003 | Barker | |
| 6,641,069 B2 | 11/2003 | Katayama et al. | |
| 7,694,907 B2 | 4/2010 | Chivarov et al. | |
| 7,789,335 B2 | 9/2010 | Halterman, Jr. | |
| 8,480,021 B1* | 7/2013 | Sauk | A01K 89/015 242/317 |
| 8,534,583 B2 | 9/2013 | David | |
| 9,700,034 B1 | 7/2017 | Chang et al. | |
| 10,045,519 B2 | 8/2018 | Sabtu et al. | |
| 2003/0168541 A1 | 9/2003 | Hill et al. | |
| 2006/0289690 A1 | 12/2006 | Marsh et al. | |
| 2008/0041999 A1* | 2/2008 | Nilsen | A01K 89/0111 242/246 |
| 2018/0014518 A1 | 1/2018 | Combs et al. | |

* cited by examiner

*Primary Examiner* — Emmanuel M Marcelo
(74) *Attorney, Agent, or Firm* — Maxey-Fisher, PLLC; Brittany J. Maxey-Fisher

(57) ABSTRACT

The present invention relates to a bevel washer including a body made of a wearable material; the bevel washer made of a wearable material forms part of a drag system for a fishing reel. In addition, the present invention relates to a drag mechanism for a fishing reel including bevel washers made of a wearable material; bevel washers made of a non-wearable material; and the bevel washer made of a wearable material and the bevel washers made of a non-wearable material are placed adjacent to each other.

11 Claims, 10 Drawing Sheets

FISHING REEL DRAG SYSTEM

TECHNICAL FIELD OF THE INVENTION

The present invention relates to fishing reels having an improved drag mechanism.

BACKGROUND OF THE INVENTION

The prior art shows a plurality of fishing reels having a diversity of drag mechanisms.

Conventional drag mechanisms for fishing reels are built into the spool of the spinning reel and include a series of wearable material washers and non-wearable material washers. Each one of the washers includes a hole in the center and are connected to the cylinder of the spool. The washers are stacked on top of one another, alternating between the wearable and non-wearable washers as they are stacked inside the center of the spool.

The wearable material washers are the part that wears out and creates the drag. In the prior art, all of the wearable material washers are flat and are used as the brake pads within the drag mechanism.

The washers are held in place by a retaining ring that includes an adjustment knob. The adjustment knob is connected to an end of the shaft. The adjustment knob permits the user to pre-set the drag tension by tightening or loosening the adjustment knob.

When a fish pulls the line, the washers rub against each other slowing the spool, applying drag pressure, and slowing down the movement of the fish without cutting the line.

As can be seen from the prior art, the manufacturers use different wearable materials, sizes, and number of washers, but all drag mechanisms work in the same principle.

Unfortunately, the known drag mechanisms do not provide effective and controlled drag for the spool and unbalanced and uneven braking force is applied to the spool; thus, the reels fail to perform efficiently when a torque load is applied to the spool.

SUMMARY OF THE INVENTION

The present invention relates to a bevel washer including a body made of a wearable material; the bevel washer made of a wearable material forms part of a drag system for a fishing reel.

In addition, the present invention relates to a drag mechanism for a fishing reel including bevel washers made of a wearable material; bevel washers made of a non-wearable material; and the bevel washers made of a wearable material and the bevel washers made of a non-wearable material are placed adjacent to each other.

DETAILED DESCRIPTION OF THE INVENTION

The drag mechanism of the present invention is configured for use on a spinning reel type fishing reel. However, one of ordinary skill will appreciate that the inventive drag mechanisms are not limited to specific fishing reel configurations.

It is an object of the present description to provide a washer that can receive a torque from a rotary shaft without being deformed.

In the present invention the terms "bevel or angled" refer to a washer having at least one angle or incline surface, or degree cut of the washer that is not perpendicular to the drag adjustment force.

In the present invention the terminology "wearable material washer" refers to a washer made of a consumable material.

In the present invention the terminology "non-wearable washer" refers to a washer made of a non-consumable material.

Figure 1:
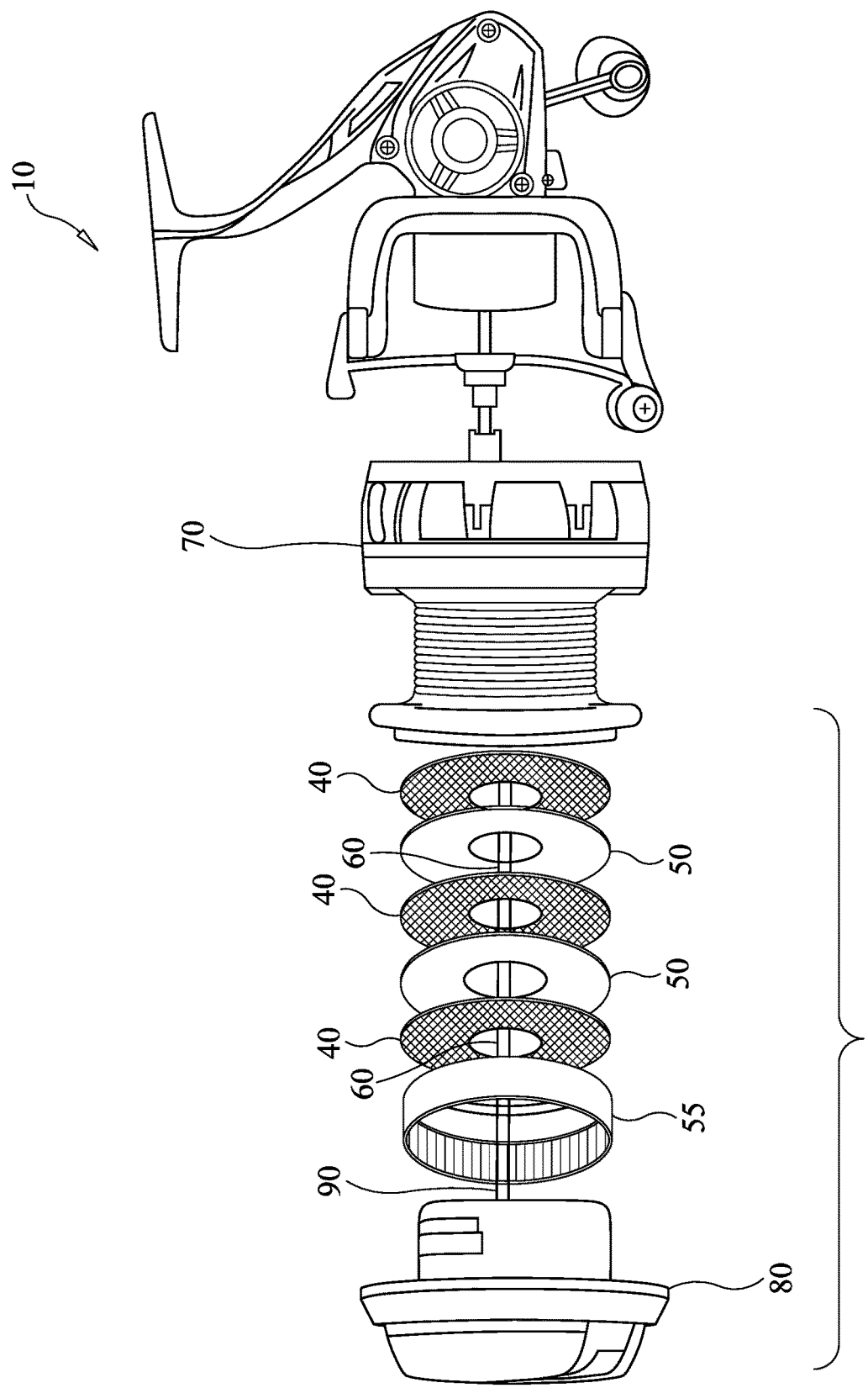
FIG. 1 shows an exploded view of a conventional fishing reel having a drag mechanism encased into the spool of the spinning reel.

FIG. 1 shows a conventional fishing reel 10 having a drag mechanism 20 encased into the spool of the spinning reel 30. The drag mechanism 20 controls the drag on the reel, meaning the resistance to rotation of spool relative to the spinning reel 30. The drag mechanism 20 includes a series of wearable material washers 40 and non-wearable material washers 50. Each one of the washers 40, 50 includes a hole 60 in the center and are connected to a shaft 65 of the cylinder of the spool 70. The washers are stacked on top of one another, alternating between the wearable and non-wearable material washers 40, 50 as they are stacked inside the center of the spool. In addition, the conventional drag mechanism 20 includes a drag knob 80 coupled to an end of the shaft 65. A drag knob click plate 55 is placed between the drag knob 80 and the flat wearable material washer 40 closer to the drag knob 80. The drag mechanism 20 may also include other components normally found in fishing reels, such as o-rings.

In another embodiment, an adjustment device is used to tighten and loosen the drag system. The type of adjustment device may depend on the type of reel and they are well known in the art.

For example, in conventional reels and baitcasting reels, the adjustment device may be a star-shaped drag adjustment wheel.

In another example, in spinning reels, the adjustment device may be a circular knob.

The washers are held in place by a retaining ring that includes an adjustment knob. The adjustment knob is connected to an end of the shaft. The adjustment knob permits the user to pre-set the drag tension by tightening or loosening the adjustment knob.

Generally, every washer in the prior art drag mechanism that is angled is made of a non-wearable metal because these washers are used as spring washers and not meant to create the drag, but rather the force. The spring washers are used for a different mechanical purpose, one that necessitates the angle (application of force).

Figure 2:
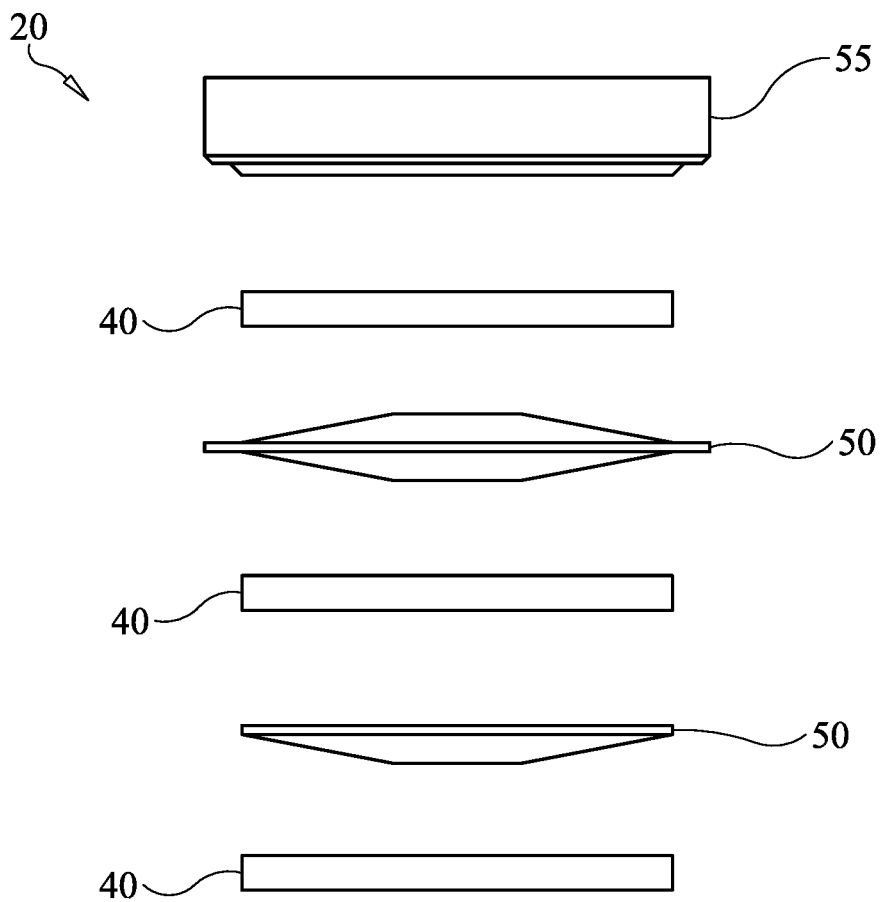
FIG. 2 shows a detailed view of the conventional drag mechanism for a fishing reel showing the flat wearable material washers and the bevel wearable material washers.

FIG. 2 shows a detailed view of a conventional drag mechanism 20 for a fishing reel showing the flat wearable material washers 40 and the bevel non-wearable material washers 50. A drag knob click plate 55 is placed between the drag knob and the flat wearable material washer 40 closer to the drag knob.

Figure 3:
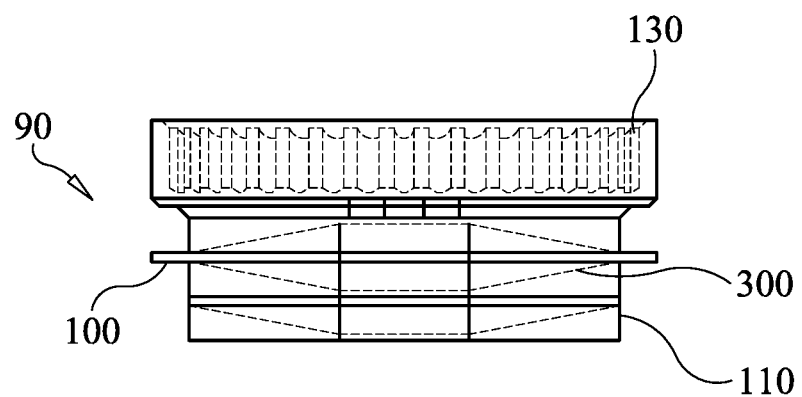
FIG. 3 shows a detailed view of a drag mechanism for a fishing reel according to an embodiment of the present invention.

FIG. 3 shows a detailed view of a drag mechanism 90 for a fishing reel according to an embodiment of the present invention. The drag mechanism 90 may be used on spools integrated into conventional fishing reels. The drag mechanism 90 shows bevel wearable material washers 100 and bevel non-wearable material washers 110. The bevel wearable material washers 100 and bevel non-wearable material washers 110 are positioned adjacent to each other.

The presence of bevel wearable material washers 100 and bevel non-wearable material washers 110 on the drag mechanism of the present invention increases the drag surface area. Its beveled cut design offers better (reduced) start-stop inertia and improves drag performance by creating a more even and balanced braking force through better distribution around the surface area of the wearable washer.

The drag mechanism 90 of the present invention is not limited by the number of bevel wearable material washers 100 and bevel non-wearable material washers 110. The drag mechanism 90 may include from 2 to 9 wearable material washers 100 and bevel non-wearable material washers 110.

In one embodiment, the present invention may optionally include a drag knob click plate 130 placed between the drag knob 80 and the bevel wearable material washer 100 closer to the drag knob.

Figure 4:
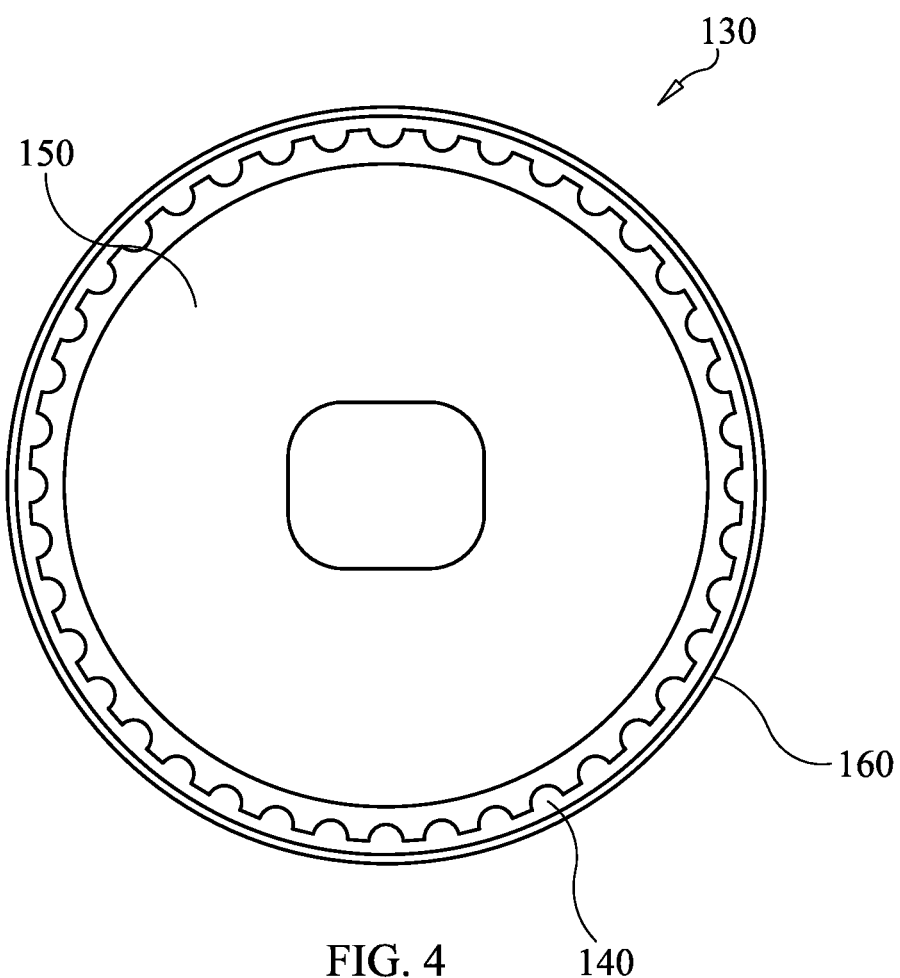
FIG. 4 shows a detailed top view of the drag knob click plate according to the present invention.

FIG. 4 shows a detailed view of the optionally drag knob click plate 130 according to the present invention. The optionally drag knob click plate 130 includes a plurality of notches 140 on the inner section 150 of the drag knob click plate 130. FIG. 4 shows 40 notches 140, however, any other suitable types and number of notches 140 may be used. In addition, the drag knob click plate 130 includes a plurality of protuberances 160 corresponding to the plurality of notches 140 to secure the bevel washers 100, 110 from rotation within the reel 30.

The drag knob click plate 130 may be made of a sturdy and non-corrosive material such as aluminum, steel, ceramic, brass, or stainless steel.

Figure 5:
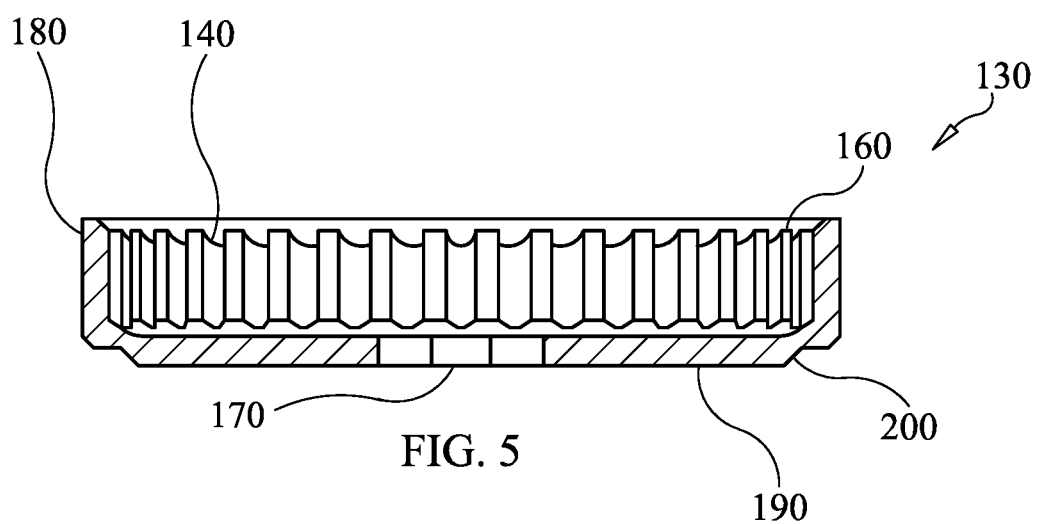
FIG. 5 shows a side view of the drag knob click plate of FIG. 4.

As can be seen by FIG. 5, the drag knob click plate 130 includes a central hole 170 with a front circular surface 180 and a rear circular surface 190. The front circular surface 180 has a diameter bigger than the rear circular surface 190 forming a seat 200.

Figure 6:
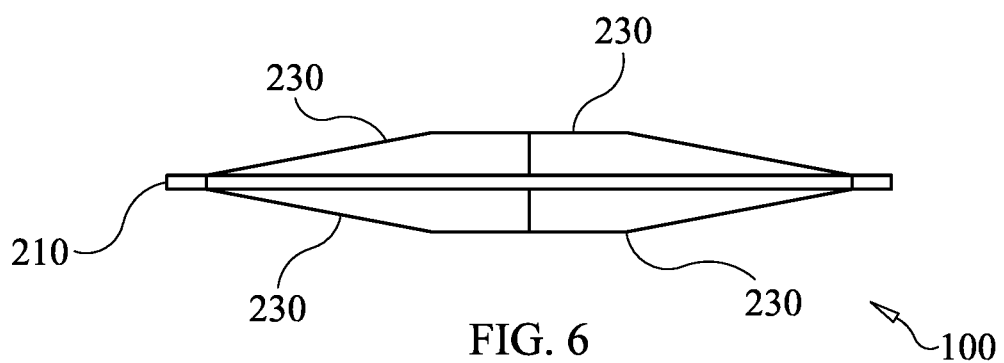
FIG. 6 shows a front view of the bevel wearable material washers according to the present invention.
Figure 7:
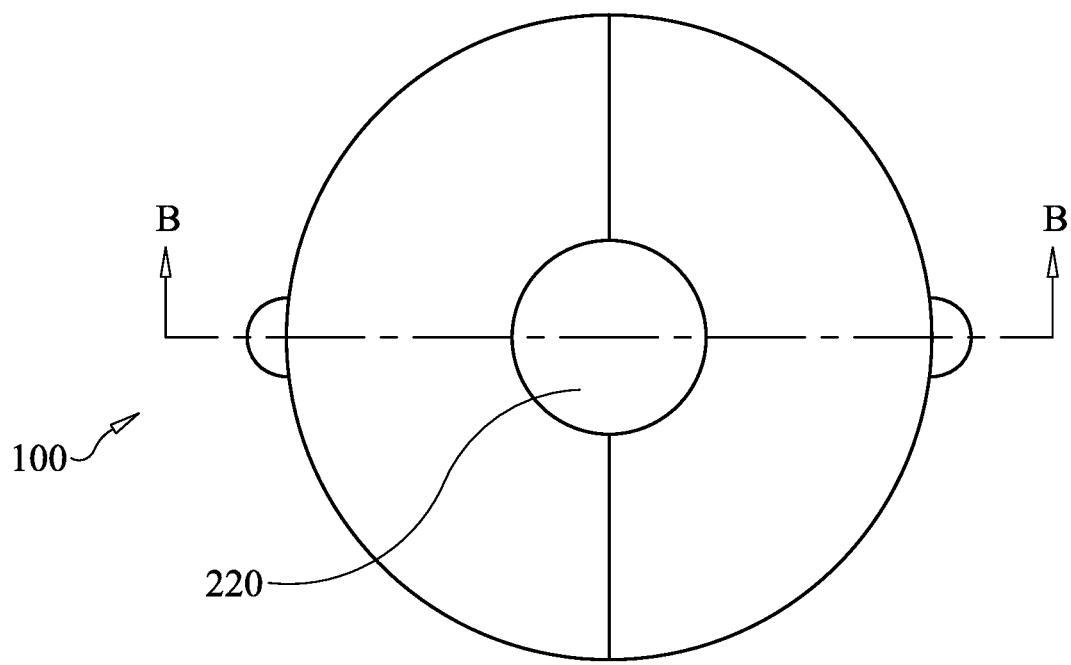
FIG. 7 shows a top view of the bevel wearable material washer of FIG. 6.
Figure 8:
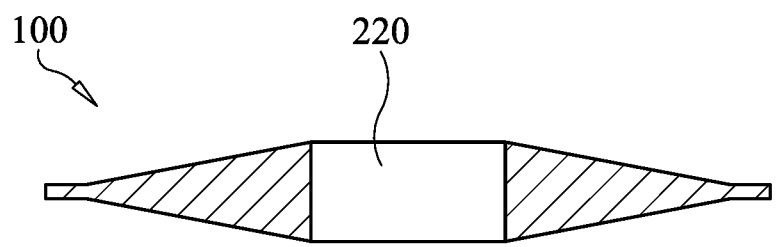
FIG. 8 shows a cross sectional view of the bevel wearable material washer taken along lines BB of FIG. 6.
Figure 9:
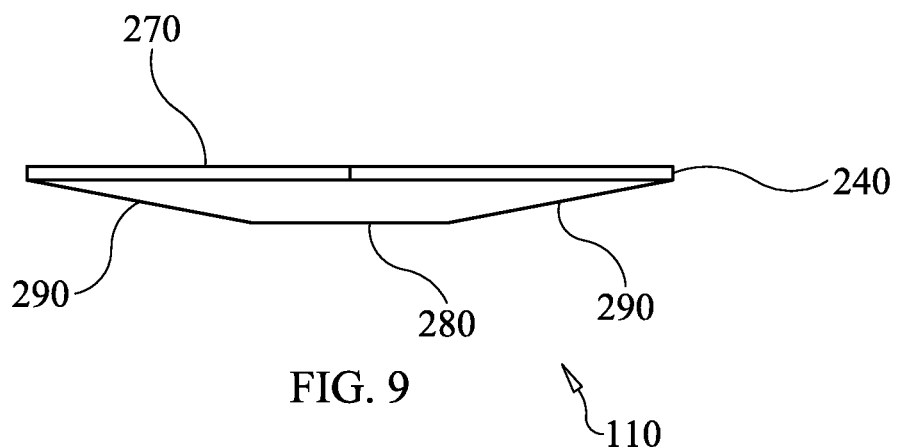
FIG. 9 shows a front view of the bevel non-wearable material washers according to the present invention.
Figure 10:
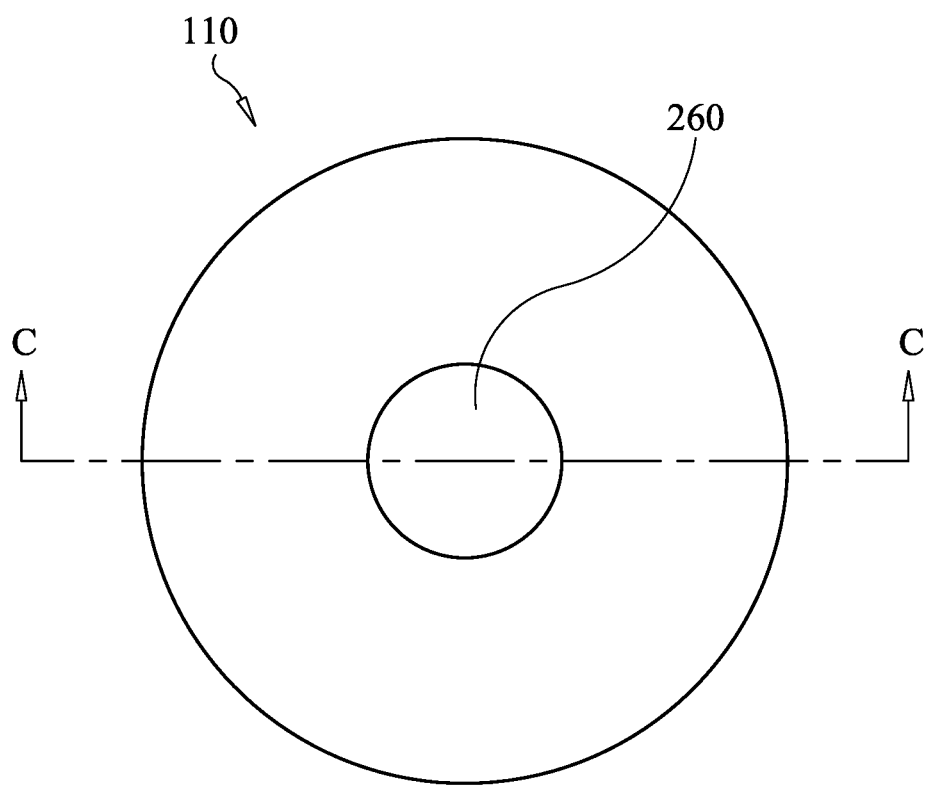
FIG. 10 shows a top view of the bevel non-wearable material washer of FIG. 9.
Figure 11:
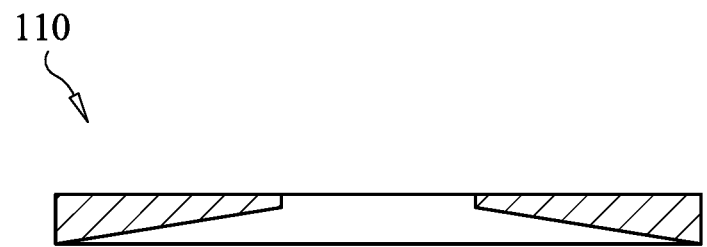
FIG. 11 shows a cross sectional view of the bevel non-wearable material washer taken along lines CC of FIG. 10.
Figure 12:
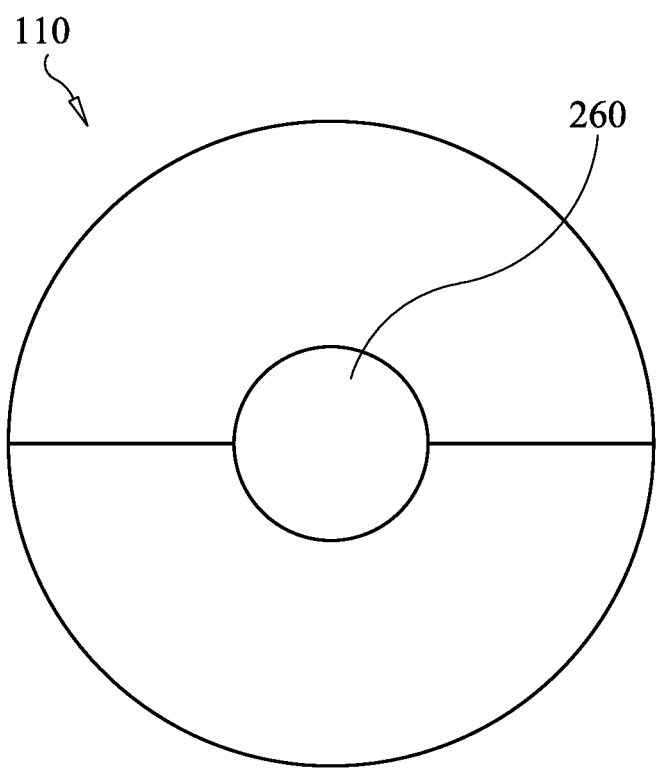
FIG. 12 shows another top view of FIG. 9.
Figure 13:
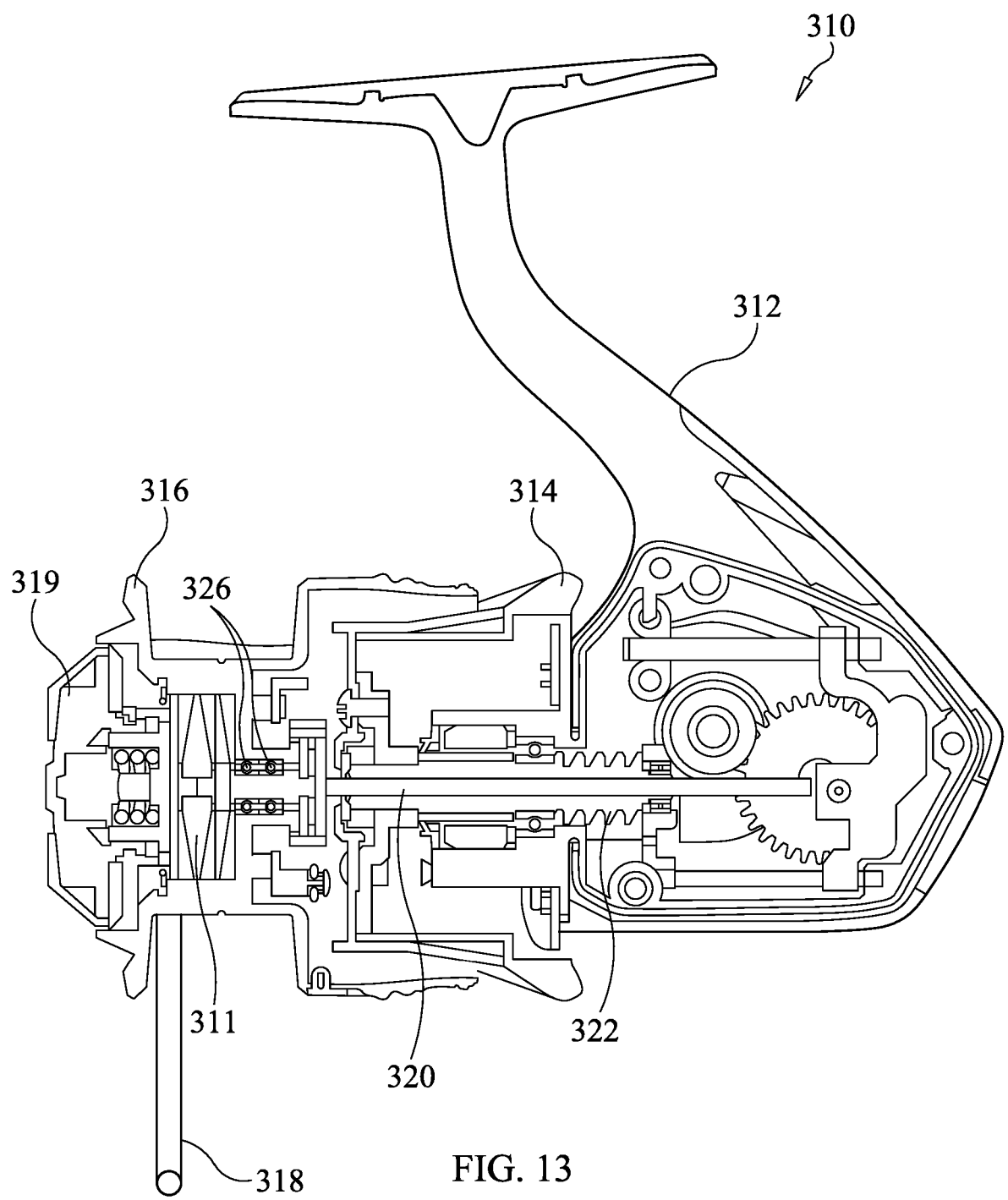
FIG. 13 shows a detailed inside view of a drag mechanism for a fishing reel according to another embodiment of the present invention showing a reel in which the click plate has been removed from the top of the washer stack.
Figure 14:
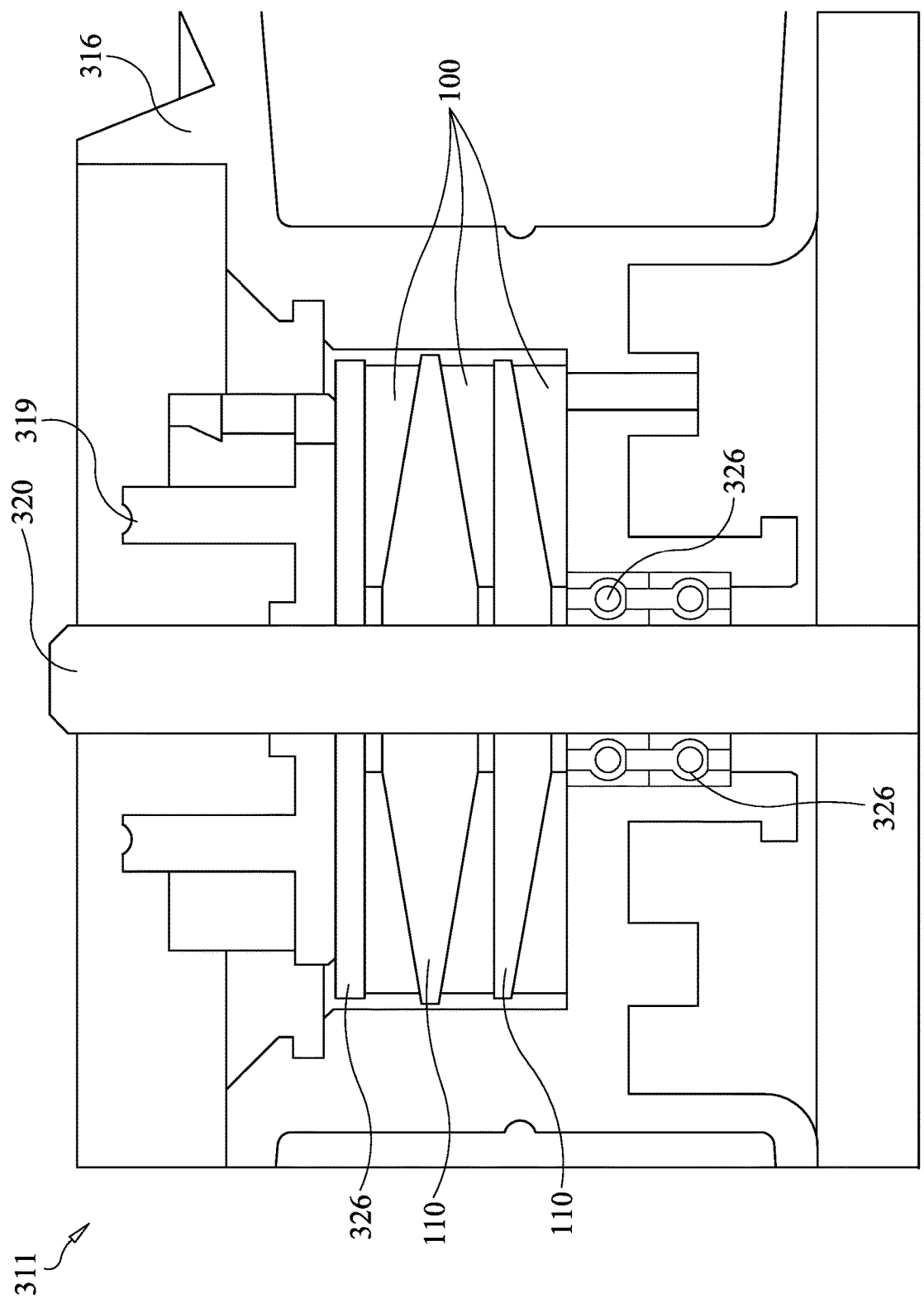
FIG. 14 shows a right detailed side view of the drag mechanism of FIG. 13.
Figure 15:
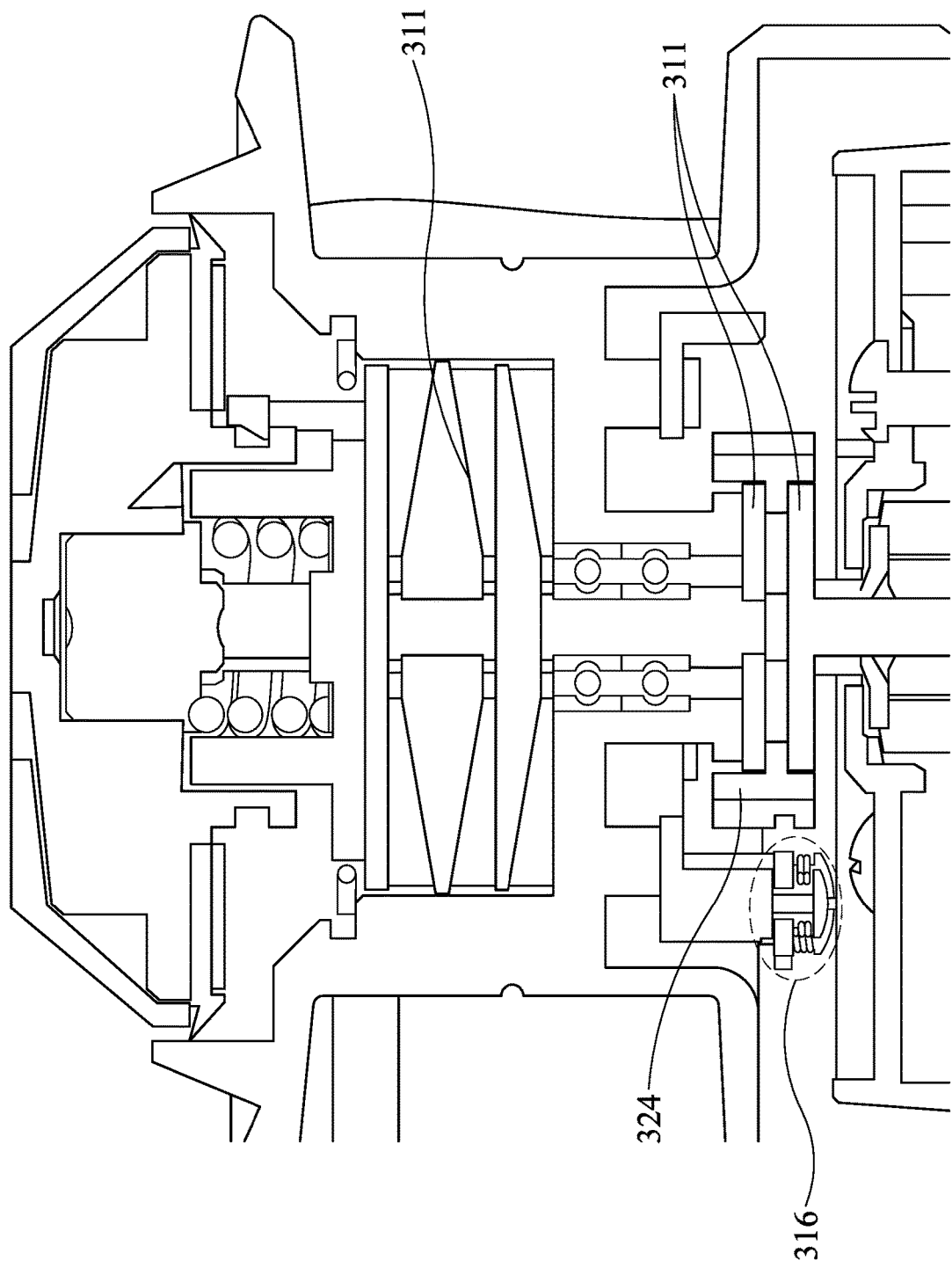
FIG. 15 shows a detailed left side view of the drag mechanism of FIG. 13.
Figure 16:
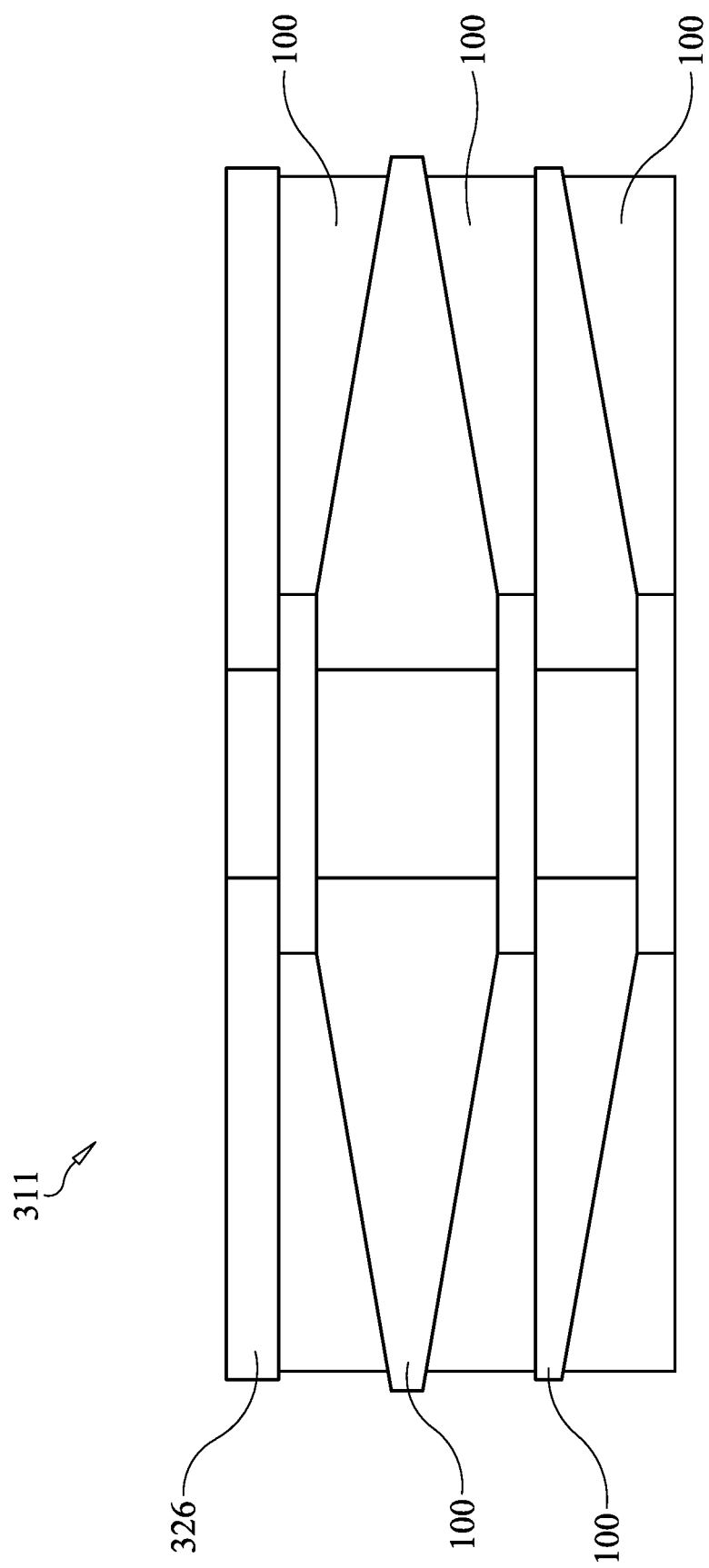
FIG. 16 shows a detailed view of the drag mechanism of FIG. 13 showing the stacked washers.

FIGS. 6-8 show bevel wearable material washers 100 according to the present invention. Each one of the bevel wearable material washers 100 includes a central body 210 with a central opening 220, a plurality of angled surfaces 230 inclined towards the central opening 220.

The wearable material washer 100 is made of a material that is softer than the material of the non-wearable material washer 110. The wearable material washer 100 may be made of ceramics, carbon-based materials, fiber reinforced composite materials, metals and alloys thereof, felt, nylon, silicone, plastic, cork, polymer, and combinations of such materials.

The present invention uses wearable washers that are angled, similar to the non-wearable washers. By doing so, the drag mechanism, according to the present invention, increases the surface area of the system, reducing the startup inertia and allowing the startup inertia to be smoother for the fisherman.

The diameter of the wearable material washer 100 may depend on the size of the fishing reel and the angle used for the angle surfaces 230. In one embodiment, the diameter of the wearable material washer 100 may be from 10 mm to 150 mm, preferably from 16 mm to 35 mm.

The angles for the wearable material washer 100 may depend on the available space in the drag stack within a spool or a driver gear. In one embodiment, the angle of the angled surface of the wearable material washer 100 may be from 160 degrees to 190 degrees from the central body 210, preferably from 170.37 degrees to 177.29 degrees from the central body 210.

The 3-D structure of the bevel wearable washer according to the present invention provides advantages over the flat design of the wearable washer over the prior art. In the flat wearable washer of the prior art the force is concentrated in the center portion of the washer. In the bevel wearable washer according to the present invention, the contact area is larger allowing the force to have better distribution away from the center of the washer; thus, smoother and more evenly balanced slippage occurs.

The angled wearable material washer 100 of the present invention replaces the traditional flat wearable material washer in the conventional drag system.

When force is applied to the system, the angled wearable washers will function to considerably reduce the startup inertia and increase the overall surface area touching the beveled washer.

FIGS. 9-12 show bevel non-wearable material washers 110 according to the present invention. Each one of the non-bevel wearable material washers 110 includes a central body 240 with a central opening 260, top flat surface 270, and an angled bottom surface 280 including a plurality of angled surfaces 290 inclined towards the central opening 260.

The diameter of the non-wearable material washer 110 may depend on the size of the fishing reel and the angle used for the angle surfaces 290. In one embodiment, the diameter of the non-wearable material washer 110 may be from 10 mm to 150 mm, preferably from 16 mm to 35 mm.

In one embodiment, the angle of the angled surface of the non-wearable material washer 110 may be from 160 degrees to 190 degrees from the central body 210, preferably from 170.37 degrees to 177.29 degrees.

As shown in FIG. 3, the bottom surface 300 of the bevel wearable material washer 100 rests on the top flat surface 270 of the bevel non-wearable material washer 110. This arrangement allows to distribute pressure more evenly across the bevel wearable material washer 100 as the drag knob 80 is rotated.

The drag system according to the present invention may be used in all types of fishing reels. The washers are located in a spool when applied to a spinning reel like in drawings shown in the present application. In addition, the washers may be located above, below, or inside the drive gear on many types of reels, and above, below or inside a spinner head in a spin cast reel.

In the embodiment shown on FIGS. 13-16, a conventional fishing reel 310 with the drag mechanisms 311 according to an embodiment of the present invention. The conventional fishing reel 310 includes a frame 312, a rotor 314 mounted to the frame 312 for rotation about an axis, a spool 316, structure for rotating the rotor 314, and a bail wire 318 on the rotor 314. The spool 318 fits over the shaft 320 with the spool retainer knob 319 that tightens the line (not shown). The rotor 314 has a pinion gear 322, which is connected to a shaft 320. Sections of the pinion gear 322 are supported rotatively with bearings 326 located on the frame 312. A click washer or a metal plate may be placed between a drag knob 319 and the bevel wearable material washer 100 closer to the drag knob.

The working mechanism of the conventional fishing reel 310 described in FIGS. 13-16 is well known in the art and will not be explained in this application.

As in previous embodiment, the drag mechanisms 311 according to the present invention includes bevel washers made of a wearable material 100 stacked with bevel washers made of a non-wearable material 110.

The invention is not limited by the number of bevel wearable material washers 100 and bevel non-wearable material washers 110. The drag mechanism 90 may include from 2 to 9 wearable material washers 100 and bevel non-wearable material washers 110.

The drag mechanism of the present invention can be adapted to be placed into any type of fishing reels, for example, spinning reels, spin cast reels, and baitcasting reels.

The drag mechanism of the present invention is easy to install and can be added to pre-existing fishing reels.

The present invention provides an improvement on the reduction in the start-stop inertia, i.e. overall drag resistance of traditional reel drag systems. This invention will utilize a beveled washer which is common in the prior art, but the novel subject matter of this patent will focus on the wearable washer, which the beveled drag washer will rub against to create the drag resistance within the system.

What is claimed is:

1. A bevel washer comprising:
   a body made of a wearable material;
   the wearable material is a consumable material selected from the group consisting of ceramics, carbon-based materials, fiber reinforced composite materials, felt, nylon, silicone, plastic, cork, polymer, and combinations thereof;
   wherein the bevel washer forms part of a drag system for a fishing reel.

2. A bevel washer according to claim 1, wherein the body includes a central opening, a plurality of angled surfaces inclined towards the central opening, a front circular surface, and a rear circular surface; the front circular surface has a diameter bigger than a diameter of the rear circular surface forming a seat.

3. The bevel washer according to claim 2, wherein angles of the angled surface of the bevel washer is from 160 degrees to 190 degrees from the body.

4. The bevel washer according to claim 1, wherein a diameter of the bevel washer is from 10 mm to 150 mm.

5. A drag mechanism for a fishing reel comprising:
   a first bevel washers made of a wearable material;
   a second bevel washers made of a non-wearable material; and
   wherein the first bevel washer and the second bevel washers are placed adjacent to each other.

6. The drag mechanism according to claim 5, further including a drag knob or an adjustment device, wherein the drag knob or the adjustment device applied a force to the adjacent second bevel washer and the first bevel washers.

7. The drag mechanism according to claim 5, wherein a diameter of the first bevel washer is from 10 mm to 150 mm.

8. The drag mechanism according to claim 5, wherein the first bevel washer includes an angled surface having angles from 160 degrees to 190 degrees.

9. The drag mechanism according to claim 5, wherein a diameter of the second bevel washer is from 10 mm to 150 mm.

10. The bevel washer according to claim 5, wherein the first bevel washer includes an angled surface having angles from 170.0 degrees to 177.2 degrees.

11. The bevel washer according to claim 5, wherein the second bevel washer includes a central body with a central opening, a top flat surface, and an angled bottom surface including a plurality of angled surfaces inclined towards a central opening.

* * * * *